April 14, 1925.                                                        1,533,126
C. B. MARTIN
RUBBER TUBE CUTTING MACHINE
Filed July 15, 1924                    2 Sheets-Sheet 1
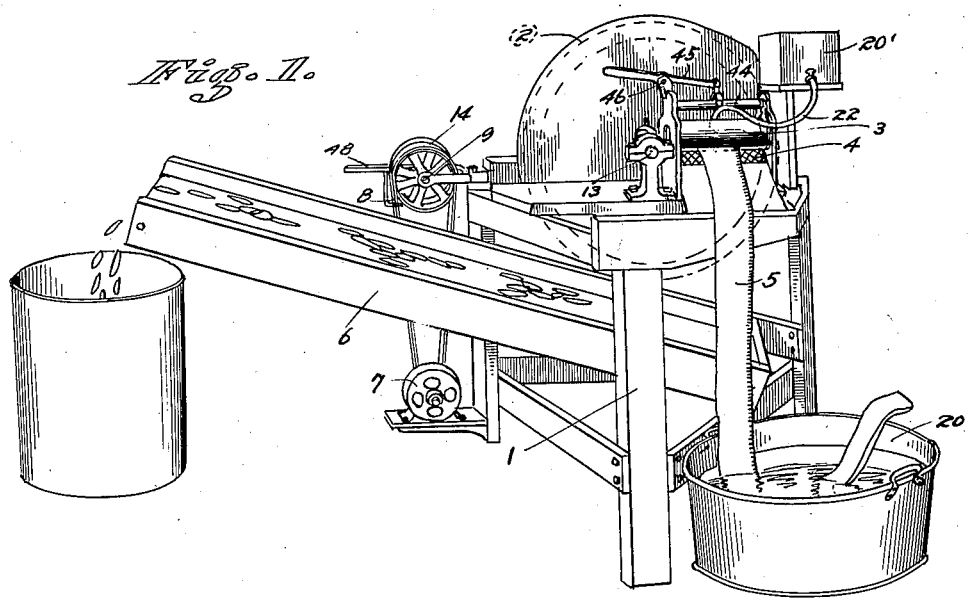
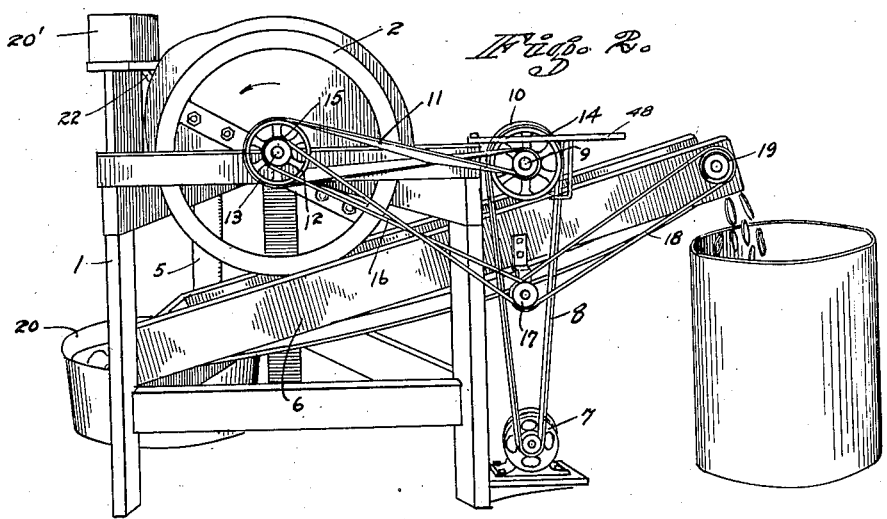
INVENTOR.
CHARLES B. MARTIN
BY
ATTORNEYS.

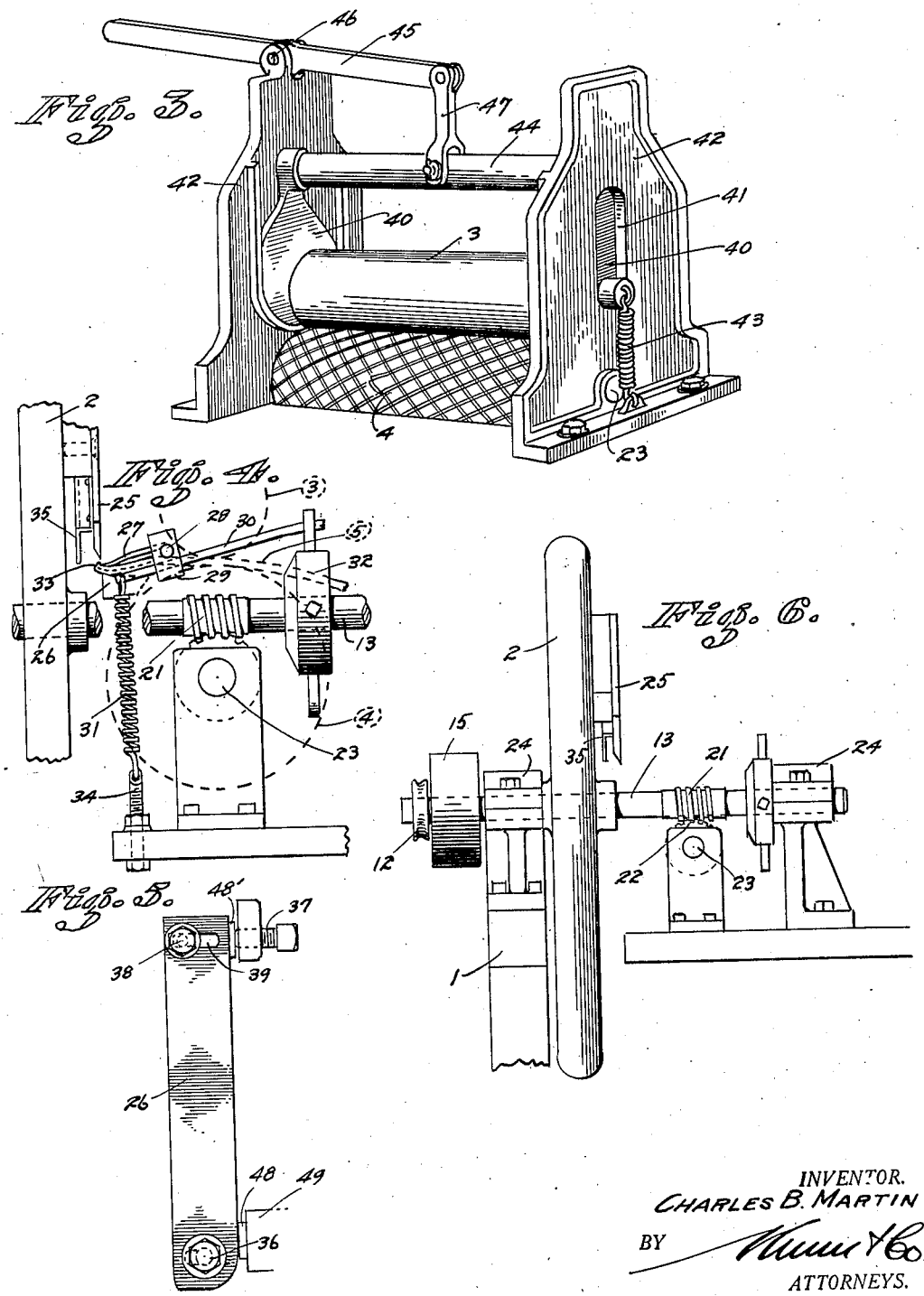

Patented Apr. 14, 1925.

1,533,126

UNITED STATES PATENT OFFICE.

CHARLES B. MARTIN, OF CANTON, OHIO.

RUBBER-TUBE-CUTTING MACHINE.

Application filed July 15, 1924. Serial No. 726,164.

*To all whom it may concern:*

Be it known that I, CHARLES B. MARTIN, a citizen of the United States, and a resident of Canton, county of Stark, State of Ohio, have invented a new and useful Rubber-Tube-Cutting Machine, of which the following is a specification.

The present invention relates to machines for cutting rubber tubes in transverse sections for the purpose of making rubber bands out of the tubes and has to do with certain improvements in a machine for this purpose described in my co-pending application for patent filed July 17, 1922, under Serial Number 575,643.

The objects of my improvements are to provide for a more effective clamping of the tube at the moment of cutting and to produce a slight tipping up of the tube at the point of cutting whereby a more even width band is formed, also means for controlling the amount of this tipped condition of the end of the tube to be cut off, also an improved application of and tripping of the clamping means, also an improved adjustment of the shearing blade, also a simpler feed roll drive, also a provision for quick insertion of the tubes between the feed rolls, also a means of treating the rubber tubes with water before and during the cutting whereby a much better action of the knives results and a smoother cut band is produced, and also improved means of discharging the finished product.

The improvements above mentioned are realized in the machine shown in the accompanying drawings and in which:

Figure 1 is a perspective view of my machine as seen from the tube feeding side thereof, Figure 2 is a similar view from the opposite side showing the machine and discharge conveyor drive, Figure 3 is a perspective detail of the upper roll lifting mechanism, Figure 4 is an enlarged representation showing the action of my tube clamp in relation to the cutting blades, Figure 5 is a detail showing the adjustable mounting of the lower blade, and Figure 6 an elevational detail of the feed roll worm drive and tube clamp trip mechanism.

As the machine embodies most of the principal elements described in my co-pending application referred to, this description will be confined as much as possible to the particular features constituting the improvements.

In the drawings, the frame of the machine is shown at (1), the cutter carrying wheel at (2), the rubber tube feeding rolls at (3) and (4), the tube (5) entering the rolls, the discharge conveyor (6), motor (7) belted at (8) to a pulley (14) on a countershaft (9) carrying tight and loose pulleys (10) belted at (11) to a pulley (12) on the cutter wheel shaft (13). A belt shifting lever (48) serves to move the belt on the tight and loose pulleys. On the end of the cutter shaft (13) is a small pulley (15) belted at (16) to a countershaft pulley (17) in turn belted at (18) to the discharge conveyor head pulley (19).

The conveyor, it will be noted, extends upwardly from beneath the machine and is arranged to discharge over its elevated end into a box or barrel placed under it.

The tube entering the rolls is first immersed in a tank of water (20) and above the rolls is another tank 20' arranged to drop water on the tube being cut as previously done.

The lower roll (4) is roughened on its surface and is driven by a worm gear from the main shaft of the cutter wheel as shown in Figure 6 and wherein the worm (21) is fixed to the shaft (13) and engages the worm wheel (22) secured to the lower roll shaft (23). The cutter wheel shaft is supported for revolution in the bearings (24) and carries the cutter blades (25) adjustably mounted on the wheel so that they can be separately adjusted to and from a stationary blade (26) over which the rubber tube is fed by the rolls.

Figure 4 shows the relation of the blades more clearly and the tube in position for cutting held down by a resilient sheet metal clamping plate (27). This plate (27) is secured to a transverse shaft or pivot (28) to which a crank (29) is secured and through which a rod (30) extends.

The rod (30) serves as a lever for operating the clamp up and down on its pivotal support and is normally pulled downwardly at one end by a spiral spring (31) to hold the clamp against the rubber tube during the cutting movement, and between cutting periods is tripped by a revolving cam (32) on the cutter shaft thereby raising the plate to permit the tube to be projected for the next cut.

It will be observed in Figure 4 that the extreme end (33) of the rubber tube is slightly turned in an upward direction before being cut off by the descending knife (25). This slight tipping of the tube is effected by the drawing back action of the pivoted clamping plate extending at an angle to its point of contact with the tube, and the amount of tip depends on the tension applied to spring (31) by means of the screw take up (34). This tipping is highly important in determining the even cutting of the rubber bands and compensates in some manner for the crawling of the rubber when engaged by the shearing knives.

Spaced from each moving blade (25) is a guard plate (35) which insures the cut off band dropping into the conveyor.

The lower blade (26) is a heavy bar with a shearing edge cooperating with the revolving blades and is held by a tap bolt (36) at its end nearest the cutter shaft and is adjustable at its outer end to and from the revolving blades by means of a screw (37) and held by a bolt (38) working through a slot (39) all as clearly shown in Figure 5. The hole for bolt (36) is also slightly elongated and a rubber shim (48) is inserted between the blade and a stop (49) on the machine, also a similar shim 48' between the blade and the screw (37). The bolts are tightened just enough to permit a slight resilient movement to the blade against the shims in cutting and thereby effecting a much better shearing action.

It should be noted that the upper feed roll (3) is an idler supported in bearing plates (40) slidable in slots (41) in the frame brackets (42) and normally held down against the lower feed roll by a spring (43) at each end.

The plates (40) are connected by a bar (44) for simultaneous lifting and a lever (45) extends above and is pivoted to the bracket at (46) and linked to the bar at (47) so that upon downward pressure at the outer end of the lever the bar is raised and with it the plates (40) and upper roll.

The features described will be seen to constitute important improvements over my earlier construction and though I disclosed the dropping of water on the tube, have found it highly desirable to pass the tube through water in order to meet the inner and under surfaces as well.

I claim:

1. In a rubber tube cutting machine of the character described, a movable cutter blade cooperating with a stationary blade, means for feeding a rubber tube endwise therebetween for cutting off rubber bands, and means for clamping the tube adjacent the point of cutting adapted to tip the portion of the tube to be cut.

2. In a rubber tube cutting machine of the character described, a movable cutter blade cooperating with a stationary blade, means for feeding a rubber tube endwise therebetween for cutting off rubber bands, means for clamping the tube adjacent the point of cutting adapted to tip the portion of the tube to be cut, and means for controlling the amount of said tip.

3. In a rubber tube cutting machine of the character described, a movable blade cooperating with a stationary blade, means for feeding a rubber tube endwise therebetween for cutting off rubber bands, and a clamp extending across the tube adapted for clamping the tube adjacent the portion to be cut, said clamp being pivoted along an axis extending transversely of the tube and above the same and being formed of sheet metal extending downwardly at an angle to engage the tube.

4. In a rubber tube cutting machine of the character described, a revolvable cutter blade cooperating with a stationary blade, means for feeding a rubber tube endwise between the blades for cutting off rubber bands and a guard on the far side of the revolvable blade to guide the cut off bands.

5. In a rubber tube cutting machine of the character described, a revolvable cutter wheel carried on a shaft, a blade carried by the wheel cooperating with a stationary blade on the machine adapted to cut off transverse strips from a rubber tube, means for feeding a rubber tube endwise between the blades, said means comprising a feed roll engaging the rubber tube, a worm wheel secured to the feed roll and a worm on the cutter wheel shaft engaging the worm wheel.

6. In a rubber tube cutting machine of the character described, a revolvable cutter wheel carried on a shaft, a blade carried by the wheel cooperating with a stationary blade on the machine adapted to cut off transverse strips from a rubber tube, means for feeding a rubber tube endwise between the blades for cutting off strips therefrom, and a traveling conveyor arranged under the machine to receive the cut off strips and extending at an upward angle to discharge said strips at an elevated point, and unitary means for driving the machine and conveyor.

CHARLES B. MARTIN.